United States Patent [19]

Reedy

[11] Patent Number: 4,747,008
[45] Date of Patent: May 24, 1988

[54] BROKEN CONDUCTOR GUARD SYSTEM FOR POWER DISTRIBUTION SYSTEMS

[76] Inventor: Irving Reedy, 3560 Holiday Ave., Apopka, Fla. 32703

[21] Appl. No.: 82,729

[22] Filed: Aug. 7, 1987

[51] Int. Cl.$^4$ .............................................. H02G 7/18
[52] U.S. Cl. .................................. 361/107; 174/40 R
[58] Field of Search ....................... 174/40 R; 361/107

[56] References Cited

U.S. PATENT DOCUMENTS

| 304,087 | 8/1884 | Edison | 361/107 X |
| 714,355 | 11/1902 | Armstrong | 361/107 |
| 4,616,287 | 10/1986 | Reedy | 361/107 |

FOREIGN PATENT DOCUMENTS 6615 1/1902 Austria ................................. 361/107

Primary Examiner—Laramie E. Askin
Attorney, Agent, or Firm—James H. Beusse

[57] ABSTRACT

A broken conductor guard system for a single neutral power distribution system in which at least one high voltage power conductor is suspended between power poles with a neutral conductor being similarly suspended between the poles vertically below the high voltage conductor includes a broken conductor guard comprising an elongated rod with hook-shaped ends clamped with a clamping mechanism to a single neutral conductor in a horizontal plane and transverse to the neutral conductor. Apparatus is coupled to the clamping mechanism for preventing rotation of the broken conductor guard about the neutral conductor so as to maintain the guard in the horizontal plane.

8 Claims, 3 Drawing Sheets

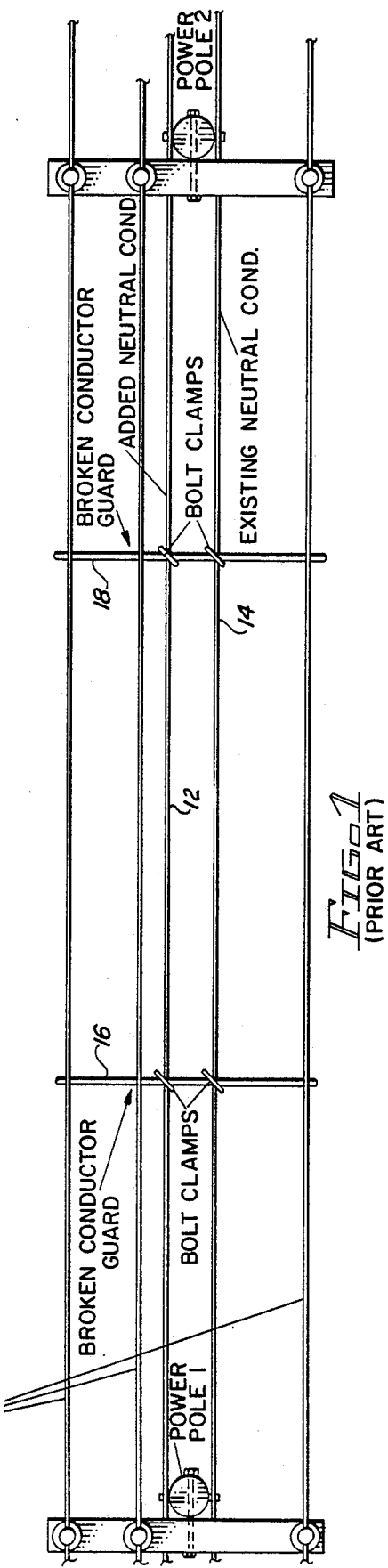
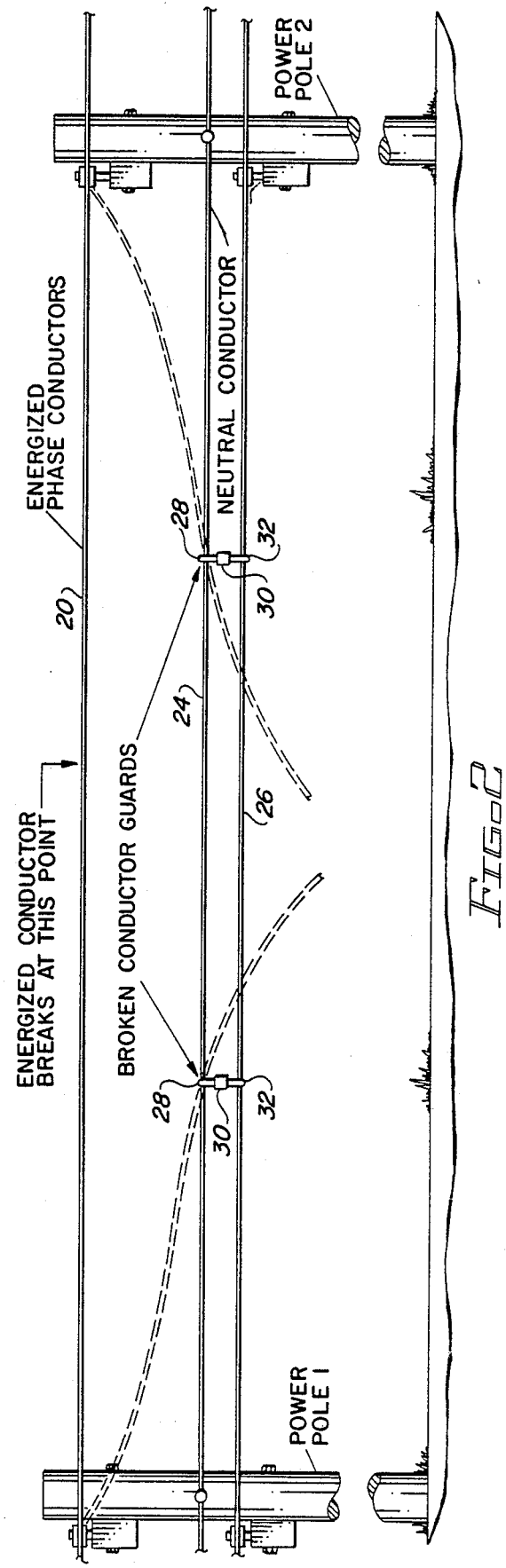

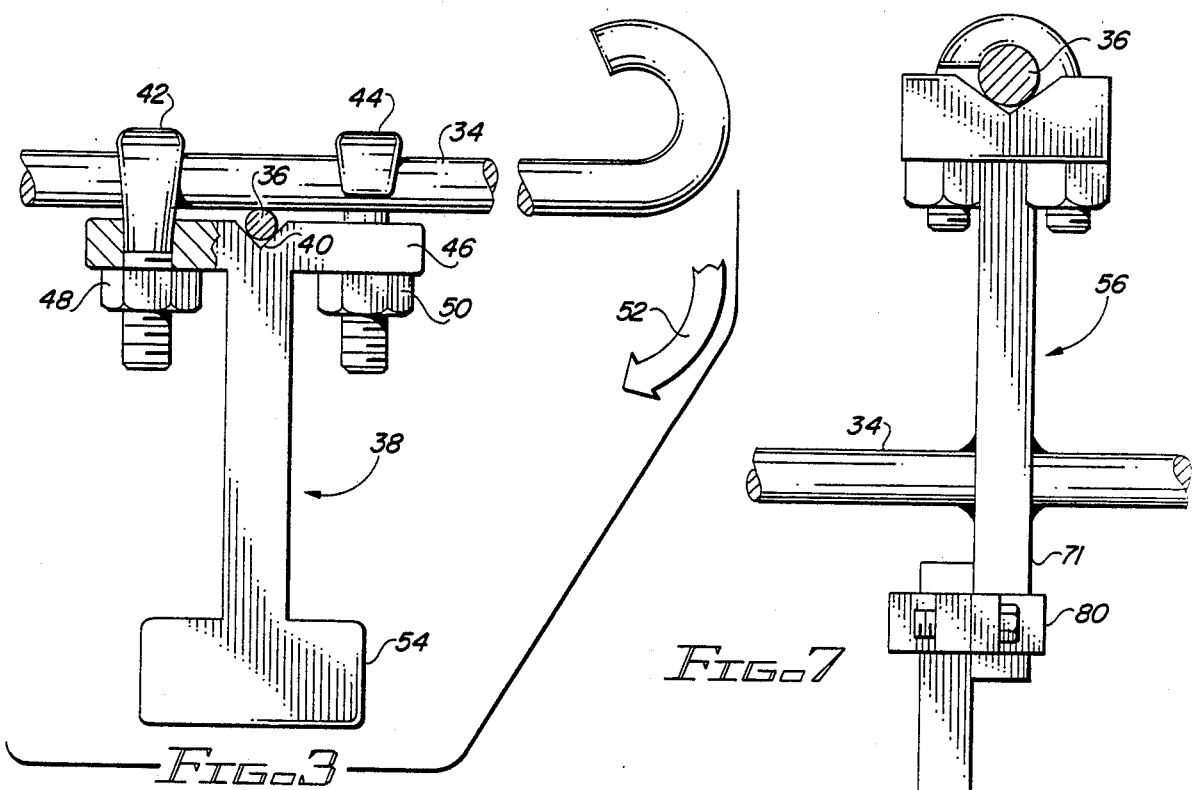
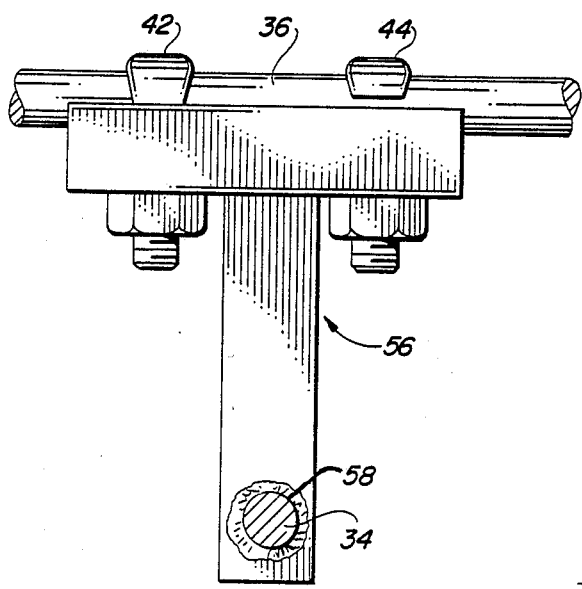
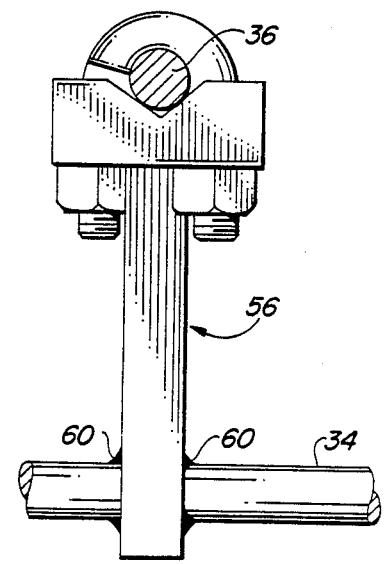

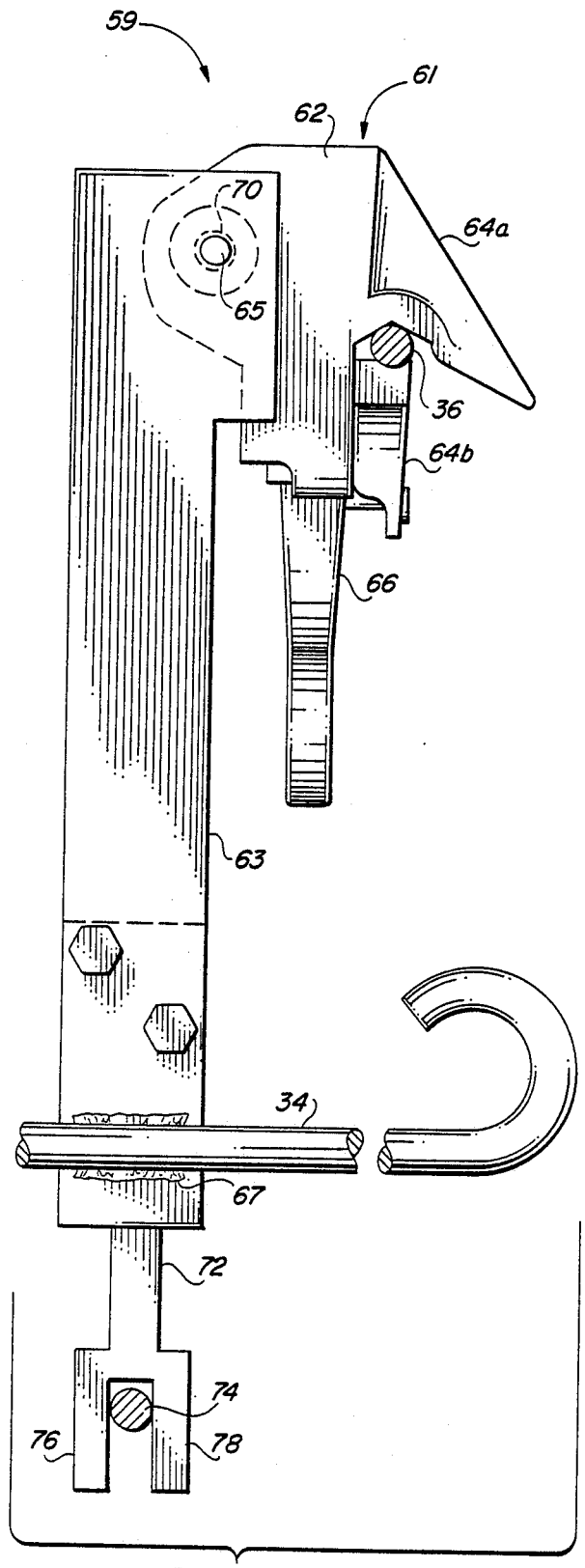
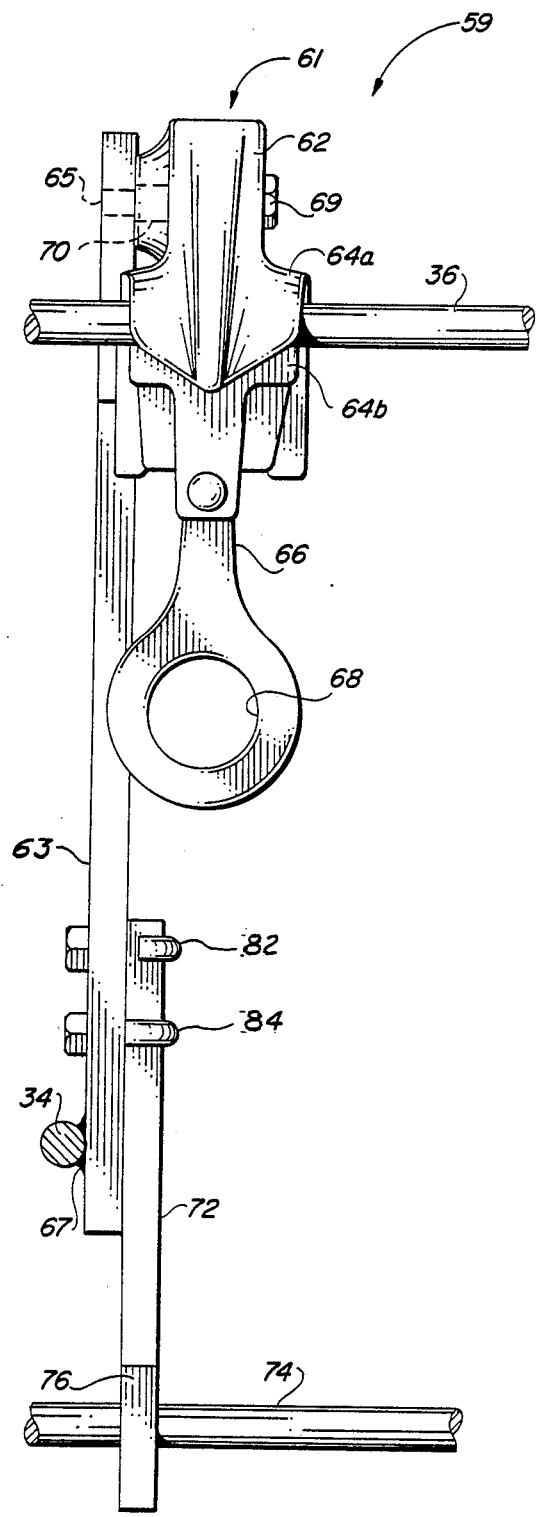

BROKEN CONDUCTOR GUARD SYSTEM FOR POWER DISTRIBUTION SYSTEMS

BACKGROUND OF THE INVENTION

This invention is related to elecrical power transmission systems with a broken conductor guard as set forth in my U.S. Pat. No. 4,616,287 issued Oct. 7, 1986, and is particularly directed to an improved broken conductor guard attachment system for electrical power distribution systems.

Electrical power reaches a consumer through two systems. The first system coupled power from a generating facility to and between substations and is referred to as a "transmission" system. Transmission systems are characterized by always using 3-phase lines, each line being of the same size, same length and balanced, regardless of the current magnitude carried by each phase.

The second system is a power "distribution" system in which distribution lines carry power from substations to users. While three phases are available from substations, loads are generally placed on the distribution lines in the form of single phase transformers and single phase taps to particular users. Transmission lines generally carry current at several thousands of volts while distribution lines may carry current at a few hundreds of volts.

Because transmission lines are at such high potentials, it is necessary to physically space the conductors of the lines widely apart in order to prevent conductor-to-conductor arcing. Applicant's aforementioned U.S. Patent describes a support arrangement for a broken conductor guard particularly adapted for transmission lines and for higher voltage distribution systems of more than one phase. Such systems require a relatively long guard and, in order to stablize such a guard, it was found necessary to attach the guard to two parallel, spaced neutral conductors. For distribution lines supplying relatively low voltage to residential users or small businesses, it is not believed economically practical to use a dual neutral conductor support arrangement for a broken conductor guard. However, even though a shorter broken conductor guard may be used for distribution systems, a guard attached to a single neutral conductor is inherently unstable and may oscillate or rotate to non-useful positions.

It is an object of the present invention to provide a broken conductor guard system for use with relatively low voltage power distribution systems. The present invention, in an illustrated embodiment, provides a clamping mechanism for attaching and supporting a broken conductor guard on a single neutral conductor such that the guard is maintained substantially in a horizontal plane below a power carrying conductor. In one form, in which the distribution system has at least one power conductor suspended between power poles with a neutral conductor suspended vertically below the power conductor, the guard comprises an elongated rod having hook-shaped ends and is supported from the neutral conductor by a clamp which holds the guard in a horizontal plane and orients the guard transverse to the neutral conductor. The clamp is stabilized by a mass located a predetermined distance below the neutral conductor, the mass acting as a pendulum to minimize rotation and oscillation of the guard. The mass may be a separate member distinct from the guard, or the guard itself can serve as the mass by suspending the guard below the neutral conductor using an elongated clamp. Further stabilization can be achieved in systems in which a consumer distribution line, e.g., a 120 VAC line, is located below the neutral conductor by providing an extension member attached to the clamp and extending vertically downward to the consumer line. The extension member is provided with a bifurcated end for receiving the consumer line so that rotation of the guard about the neutral conductor is opposed by reaction of the extension member against the consumer power line.

BRIEF DESCRIPTION OF THE DRAWING

For a better understanding of the present invention, reference may be had to the following detailed description taken in conjunction with the accompanying drawing in which:

FIG. 1 illustrates a top plan view of typical power lines in conjunction with broken conductor guards in a prior art arrangement;

FIG. 2 is an elevation view of power lines having a broken line contacting broken conductor guards supported in accordance with the present invention;

FIG. 3 is an end elevational view with parts broken away and parts in section of one form of broken conductor guard and clamping mechanism including a pendulum mass in accordance with the present invention;

FIG. 4 is a side elevational view with parts broken away and parts in section of a broken conductor guard and clamping mechanism similar to that of FIG. 3 but in which the pendulum mass has been replaced by the mass of the broken conductor guard itself;

FIG. 5 is a view of the broken conductor guard and clamping mechanism of FIG. 4 rotated 90°;

FIGS. 6A and 6B are, respectively, side and end elvational views with parts broken away and parts in section of an alternative form of clamping mechanism, including an extension member, utilizing a commercially available hot line clamp to support the broken conductor guard; and FIG. 7 is an end elevational view with parts broken away and parts in section illustrating use of an extension member to overlap a lower conductor for greater stabilization of the broken conductor guard.

DETAILED DESCRIPTION

Turning first to FIG. 1, the top plan view shows an arrangement in which three energized phase conductors are supported from cross arms attached to power poles. In this arrangement, there is provided an extra or added neutral conductor 12 running parallel to an existing neutral conductor 14. A pair of broken conductor guards indicated at 16 and 18 are clamped in a horizontal plane below the energized conductors and are oriented transverse to the direction of travel of the power line. The broken conductor guards are shown in my prior U.S. Pat. No. 4,616,287 and are essentially elongated rods having hook-shaped ends which are turned upward for catching conductors as they fall and preventing them from falling off the ends of the rod to contact the ground. The disclosure of my prior U.S. Pat. No. 4,616,287 is hereby incorporated by reference.

FIG. 2 is an elevation view of a typical power distribution line in which an intermediate voltage level energized phase conductor 20 is supported on cross arms above a neutral conductor 24. Typically, a low voltage power conductor 26 will be positioned below the neutral conductor. The low voltage power conductor 26 is typically a 120 volt AC line which provides power to residences or small businesses. These relatively low voltage consumer lines, i.e., the 120 volt AC lines, are generally considered not to be of sufficient danger to require that they be positioned above the neutral conductor. The intermediate voltage phase conductor 20 may be at several hundreds of volts and for the purpose of this description will be referred to as a high voltage conductor on the distribution line. FIG. 2 illustrates the use of the system of the present invention for catching a broken conductor in which a pair of broken conductor guards and clamping mechanisms 28 are attached to the neutral conductor 24. Each of the guards and clamping mechanisms 28 includes a mass 30 suspended below the neutral conductor for adding stabilization to the guard system to prevent the guard system from being rotated or oscillated about the neutral conductor by wind or other vibrations of the neutral conductor. The broken conductor guards and clamping mechanisms 28 may also include extension members 32 which extend to the low voltage conductor 26 and terminate in bifurcated ends which fit on either side of this low voltage conductor. The extension member 32 reacts against the low voltage conductor 26 to further assist the guard assembly in remaining in its vertically oriented position below the neutral conductor.

FIG. 3 is an end elevational view of one form of clamping mechanism and a single neutral broken conductor guard. In FIG. 3, the broken conductor guard is illustrated at 34 and a neutral conductor is indicated at 36. The guard 34 is clamped against the neutral conductor 36 utilizing an elongated clamping member 38. The clamping member 38 has a top surface including a V groove 40 in which the neutral conductor 36 resides. The guard 34 is held tightly against the neutral conductor 36 by means of a pair of J bolts 42 and 44 which extend through an upper clamping block 46 of clamping member 38. The J bolts are of a type well known in the art and may be appropriately tightened by means of threaded ends and nuts 48 and 50 to rigidly secure the guard 34 against the neutral conductor 36.

In order to prevent or minimize the tendency of the guard 34 from rotating in a clocwise direction, as indicated by the arrow 52, about the neutral conductor 36, there is provided a mass 54 attached to the clamping member 38 and suspended below the level of the neutral conductor 36. The mass 54 acts as a pendulum to provide additional weight directly below the neutral conductor 36 so as to resist any tendency of the guard 34 to rotate about the neutral conductor 36.

Turning now to FIG. 4, there is shown an alternate embodiment of the clamping mechanism of FIG. 3 in which the mass 54 has been replaced by the mass of the rod guard 34. In FIG. 4, the J-bolts are utilized to clamp the neutral conductor 36 directly to a top member of a guard clamping mechanism 56. FIG. 5 is a view of FIG. 4 rotated 90° to show the J-bolts being slightly offset to allow one to be placed on each side of the neutral conductor 36. The clamping mechanism 56 is provided with an aperture 58 passing through a distal end from the neutral conductor 36, the aperture 58 being sized to accept the guard 34. The guard 34 may be welded to the clamping mechanism 56 as indicated by the welds 60. The advantage of the arrangement illustrated in FIGS. 4 and 5, is that the mass of the guard now replaces the mass 54 of FIG. 3. Since the guard provides more mass than might normally be added by use of the mass 54, the system becomes more stable with less tendency to rotate about the neutral conductor 36.

Turning to FIGS. 6A and 6B, there is illustrated an alternate form of clamping mechanism 59 utilizing an existing hot line clamp 61 for attaching the broken conductor guard 34 to a single neutral 36. The hot line clamp 61 is a commercially available connector and incorporates an upper portion 62 which has a beak-shaped, overhanging jaw member 64a for slipping over a conductor. The clamp 61 is tightened on a conductor by means of a lower jaw member 64b coupled to a threaded shaft member 66. The upper portion 62 is internally threaded for receiving shaft member 66 so that rotation of member 66 is effective to move jaw member 64b toward or away from jaw member 64a. The shaft member 66 includes an aperture 68 provided to allow the clamp 61 to be attached to a high voltage line utilizing a "hot stick". The "hot stick" can be used to turn the shaft member 66 in order to tighten the clamp onto a conductor. Additionally, there is provided a second connection point at 70 for attaching other conductors to the hot line clamp. The advantage of the hot line clamp in attaching to a single conductor is that only one threaded attachment need be made. Furthermore, it is readily easy to slip the hot line clamp over a conductor and tighten it in place. This may be particularly advantageous in installation of broken conductor guards in residential areas where it is not practical to bring in a truck-mounted "cherry picker". In those situations, the guard can be installed by using a long hot stick to position the clamping assembly 59 on neutral conductor 36 and to tighten the clamp 61 in place. The guard 34 is preferably attached to a metal plate 63 either by welding (indicated at 67) or use of J-bolts. The plate 63 has a threaded aperture 65 at an end distal from guard 34. A bolt 69 is used to attach the plate 63 and guard 34 to clamp 61 at the aperture 70.

With reference to FIGS. 6A, 6B and 7, there is shown an extension member 72 coupled to and depending from a guard assembly in a manner to provide additional stabilization for the broken conductor guard. In FIG. 7, the guard 34 is supported by an assembly essentially the same as that shown in FIGS. 4 and 5 with the exception of an extension 71 extending slightly below the guard 34. The extension member 72 is clamped to the end of the clamping mechanism 56 and extends vertically downward toward a relatively low voltage conductor 74. The extension member 72 is bifurcated at its lower end so that it has two sections 76 and 78 straddling the conductor 74. It will be seen that any tendency of the broken conductor guard assembly to rotate about the neutral conductor 36 will be opposed by the reaction of the conductor 74 against the opposed sections 76 and 78 of the extension member 72. The extension member 72 may be clamped to the clamping mechanism 56 by means of a split type clamp 80 of a type well known in the art. It will also be appreciated that the extension member 72 could as easily be attached to the clamping member 38 of FIG. 3 and would provide the same type of support for the clamping member 38 to resist rotation of the rod 34 about the neutral conductor 36. Clamping of the extension member 72 to the clamping member 38 may be required if the spacing between the neutral conductor and the low voltage power line is relatively close.

In FIGS. 6A and 6B, the extension member 72 is clamped to the plate 63 by means of J-bolts 82,84. It will be recognized that extension member 72 must be formed of a non-conductive material to prevent shorting of conductor 74 to neutral conductor 36. Various types of polymers are known for use in forming such devices as member 72 with the restriction that the selected material should be resistant to breakdown under ultraviolet (UV) radiation.

It will be appreciated that what has been described is a method and apparatus for clamping a broken conductor guard to a single neutral conductor in such a manner as to minimize the opportunity for the rod to rotate or oscillate about the neutral conductor. The invention eliminates the need to add a second neutral and may advantageously be used in those systems in which the broken conductor guard is of relatively short length. In high voltage power transmission systems in which the broken conductor guard may attain lengths up to 12 feet, the suspension system utilizing an extra neutral to provide support for the guard may be required.

What is claimed is:

1. A broken conductor guard system for a single neutral power distribution system of the type in which at least one high-voltage power conductor is suspended between power poles, a neutral conductor being similarly suspended between the poles vertically below the high-voltage conductor, the broken conductor guard system comprising:
   a broken conductor guard comprising an elongated rod having hook-shaped ends;
   clamping means for attaching said guard to a neutral conductor in a horizontal plane and transverse to the neutral conductor; and
   means coupled to said clamping means for suspending a stabilizing mass below the neutral conductor for stabilizing said guard in said horizontal plane.

2. The broken conductor guard system of claim 1 wherein the power distribution system includes at least one relatively low voltage power conductor suspended between the power poles vertically below the neutral conductor, the guard system including an electrically insulating extension member attached to said clamping means for extending vertically downward toward the low voltage conductor, said extension member having a bifurcated end portion for receiving the low voltage conductor, said extension member being responsive to rotation of said guard about the neutral conductor to react against the low voltage conductor for resisting such rotation.

3. The broken conductor guard system of claim 1 wherein said clamping means comprises a hot line clamp and said suspending means comprises an elongated plate-like membe having one end attached to said hot line clamp, said conductor guard being attached to another end of said plate-like member depending below said hot line clamp.

4. The broken conductor guard system of claim 3 wherein the power distribution system includes at least one relatively low voltage power conductor suspended between the power poles vertically below the neutral conductor, the guard system including an electrically insulating extension member attached to said plate-like member for extending vertically downward toward the low voltage conductor, said extension member having a bifurcated end portion for receiving the low voltage conductor, said extension member being responsive to rotation of said guard about the neutral conductor to react against the low voltage conductor for resisting such rotation.

5. A broken conductor guard system for a single neutral power distribution system of the type in which at least one high voltage power conductor is suspended between power poles, a neutral conductor being similarly suspended between the poles vertically below the high voltage conductor, the broken conductor guard system comprising:
   a broken conductor guard comprising an elongated rod having hook shaped ends; and
   an elongated clamping means for attaching said guard to a neutral conductor in a horizontal plane and transverse to the neutral conductor, said clamping means including a clamping block for fixedly attaching said clamping means to the neutral conductor such that said clamping means extends downwardly from the neutral conductor, said guard being fixedly attached to said clamping means a predetermined distance below a level of said neutral conductor, said guard acting as a suspended stabilizing mass below the neutral conductor for stabilizing said guard in a horizontal plane.

6. The broken conductor guard system of claim 5 wherein the power distribution system includes at least one relatively low voltage power conductor suspended between the power poles vertically below the neutral conductor, the guard system including an electrically insulating extension member attached to said clamping means for extending vertically downward toward the low voltage conductor, said extension member having a bifurcated end portion for receiving the low voltage conductor, said extension member being responsive to rotation of said guard about the neutral conductor to react against the low voltage conductor for resisting such rotation.

7. The broken conductor guard system of claim 5 wherein said clamping block has a V-shaped groove for receiving the neutral conductor and fastening means for rigidly clamping the neutral conductor in the groove, said clamping means having an arm extending vertically downward from said clamping block when said clamping block is clamped to the neutral conductor, and means at the distal end of said arm from said clamping block for rigidly affixing said conductor guard to said arm.

8. The broken conductor guard system of claim 7 wherein the power distribution system includes at least one relatively low voltage power conductor suspended between the power poles vertically below the neutral conductor, the guard system including an electrically insulating extension member attached to said arm for extending vertically downward toward the low voltage conductor, said extension member having a bifurcated end portion for receiving the low voltage conductor, said extension member being responsive to rotation of said guard about the neutral conductor to react against the low voltage conductor for resisting such rotation.

* * * * *